Figure 1:
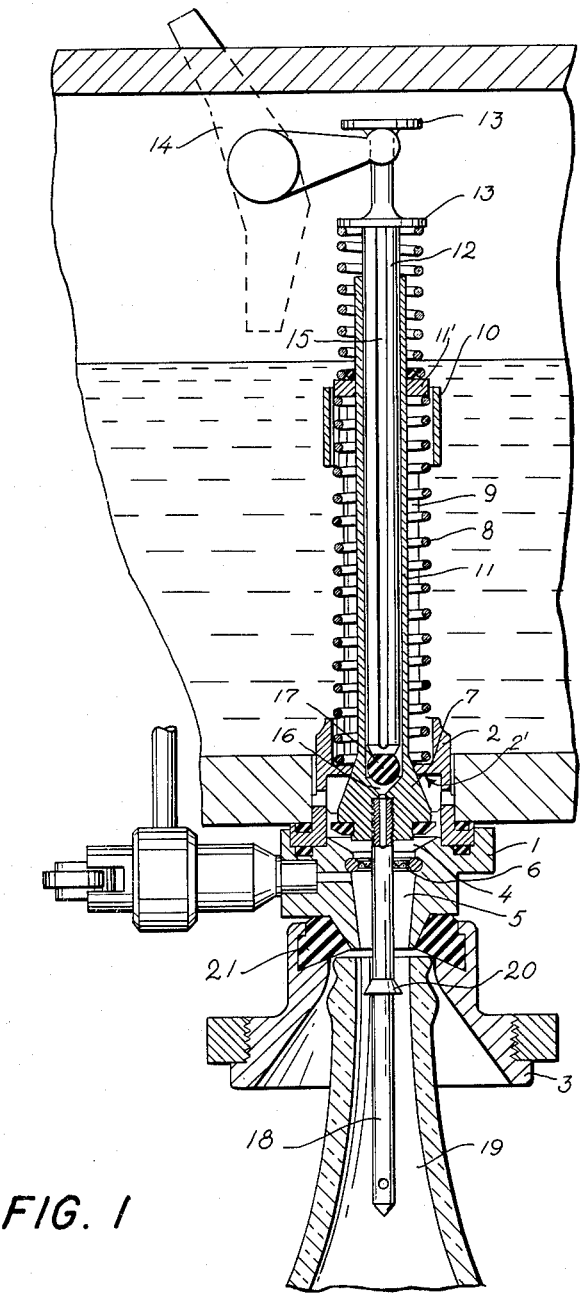

INVENTORS
Aloys Hinxlage
Karl Quest
BY
Michael J. Striker
Atty

United States Patent Office 3,212,537
Patented Oct. 19, 1965

3,212,537
PROCESS AND APPARATUS FOR HANDLING
AIR-SENSITIVE LIQUIDS
Aloys Hinxlage and Karl Quest, Dortmund, Germany, assignors to Holstein and Kappert Maschinenfabrik Phönix G.m.b.H., Dortmund-Wambel, Germany
Filed Aug. 29, 1962, Ser. No. 220,205
Claims priority, application Germany, Feb. 24, 1962,
H 44,994
8 Claims. (Cl. 141—6)

The present invention relates to method and apparatus for filling containers with air-sensitive liquid.

It is well known that certain liquids are sensitive to air and in order to fill containers with such liquids it is necessary to take precautionary measures so that the liquid will reach the ultimate consumer in a container in a proper condition. For example, in the case of beer, it is necessary to take such precautions because beer is sensitive to air and will be undesirably influenced by excessive exposure to air before the beer reaches the ultimate consumer, and it therefore well known in the art to use various measures in the handling of a liquid such as beer so as to protect it from the influence of air during the steps in the handling of the beer prior to the time when it reaches the ultimate consumer.

It is accordingly a primary object of the present invention to provide a process and apparatus for filling containers with an air-sensitive liquid while at the same time guaranteeing that an extremely small amount, if any, air is in the container with the air-sensitive liquid.

It is furthermore an object of the present invention to provide a process and apparatus capable of filling a series of containers with air-sensitive liquid while at the same time maintaining at a minimum the air which is in the containers and also maintaining at a minimum the influence of air on the liquid before it is supplied to the containers.

It is also an object of the present invention to provide a method and apparatus capable of accomplishing the above objects while at the same time being extremely simple and economical so that it is commercially feasible to practice the invention.

With the above objects in view the invention includes, in a process for filling containers with air-sensitive liquid, the steps of placing a container in communication with a source of vacuum so as to evacuate the interior of the container and then directing into the interior of the evacuated container a gas which is inert to air and subsequently filling the container with the air-sensitive liquid so that the liquid which flows into the container displaces therefrom the inert gas as well whatever air remains in the container after evacuation thereof. The apparatus of the invention includes in addition to a filling valve means capable of placing the interior of the container in communication with the air-sensitive liquid with which the container is to be filled, a vacuum valve means which is operatively connected to the filling valve means to place the interior of the container in communication with a source of vacuum prior to actuation of the filling valve means to place the interior of the container in communication with the air-sensitive liquid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal sectional illustration of a structure according to the invention; and FIGS. 2–7 diagrammatically illustrate steps in the process of the invention.

Referring to FIG. 1 it will be seen that the structure illustrated therein includes a valve housing 1 which is fixed to the vessel in which is located the air-sensitive liquid which is to be filled into the container 19 shown at the lower part of FIG. 1, and the valve housing 1 is connected with a frame 2 which forms part of a valve structure and which extends into the interior of the vessel, as illustrated in FIG. 1. Below the housing 1 is located a centering ring 3 used in the manner known in the art for centering the neck of the container 19 with respect to the filling valve means which serves to place the interior of the container 19 in communication with the air-sensitive liquid in the vessel, this liquid being, for example, beer. The valve housing 1 is formed with a valve seat 4, and extending across the interior of the valve housing 1 just below the valve seat 4 is a fine wire mesh 6 which in a manner known in the art serves at the end of the filling process to prevent gas from entering into the liquid in the vessel and bubbling therethrough.

Within the hollow frame portion 2 of the filling valve means is located a valve member 7 which cooperates with the valve seat 4 in order to close the communication between the interior of the container 19 and the liquid when the valve member 7 engages the valve seat 4. A spring 8 is coiled about an elongated tubular portion 11 of the valve member 7, and this spring 8 bears at its lower end against an inner flange 2' of the frame 2 and at its upper end against a ring or collar 11' which is fixed to the tubular portion 11 so that the spring 8 urges the valve member 7 to its open position, and, as is shown in FIG. 1, the valve member 7 engages the inner flange of the frame portion 2 so as to limit the upward movement of the valve member 7 by the spring 8. The frame 2 includes a pair of integral elongated portions 9 between which the spring 8 is located, and at their upper ends these elongated portions 9 are integral with a sleeve 10 in which the collar fixed to the tubular portion 11 is capable of sliding. In this way the sleeve 10 serves to guide the valve member 7 through its elongated tubular portion 11 for axial movement so as to guide the valve member 7 between its open and closed positions.

Within the elongated hollow tubular portion 11 of the valve member 7 is located an elongated rod 12 which projects upwardly beyond the tubular portion 11 where the rod 12 fixedly carries a pair of discs 13 which are spaced from each other in a manner shown at the upper portion of FIG. 1. A control means 14 cooperates with the discs 13 for moving the rod 12 axially in a manner described below. The rod 12 forms part of a structure for placing the interior of the container 19 in communication with the gas in the space above the liquid in the vessel which contains the liquid, and in order to promote the flow of gas the rod 12 is formed with a plurality of longitudinally extending exterior grooves 15, and the rod 12 fixedly carries at its lower end a valve member 17 which is of a substantially spherical configuration. The valve member 7 is formed with an axial bore 16 which is adapted to be closed by the valve member 17, and the axial bore 16 of the valve member 7 is prolonged by the elongated tube 18 which is fixed to the valve member 7 and which projects downwardly therefrom in the manner indicated in FIG. 1, the hollow elongated tube 18, being, for example, threaded to the valve member 7 and having at its lower end a closed end wall. The tube 18 is formed adjacent its lower closed end with an opening visible adjacent the bottom end of tube 18 of FIG. 1, so that the interior of the tube 18 can communicate with the interior of the container 19 or with the outer atmosphere through this opening which passes through the wall of the tube 18 adjacent to its lower closed end. The tube 18 fixedly carries intermediate its ends a frustoconical baffle 20 which serves to direct the liquid outwardly from the tube 18 against the inner surface of the container 19, as described below.

The centering ring 3 is guided by an unillustrated structure well known in the art for vertical movement, and this centering ring 3 carries a ring 21 of soft rubber or the like and acting as a sealing ring. The valve housing 1 also fixedly carries a vacuum valve means 22 capable of communicating through the valve housing 1 with the interior of the container 19, and the vacuum valve means 22 is placed in communication with a source of vacuum in any suitable way well known in the art, the details of the manner in which the valve 22 communicates with the source of vacuum forming no part of the present invention. For example, the intake conduit of a vacuum pump may be placed in communication with the valve 22 so that when the latter is opened the container 19 which also communicates with the valve 22 will be placed in communication with a source of vacuum.

It will be noted from FIG. 1 that a second spring is located between the collar which engages the top end of the spring 8 and the lower disc 13 which is fixed to the rod 12, and this second spring acts independently of the spring 8 and urges the rod 12 to the position illustrated in FIG. 1.

The manner in which the structure of the invention is operated to practice the process of the invention is illustrated in FIGS. 2–7.

Figure 2:
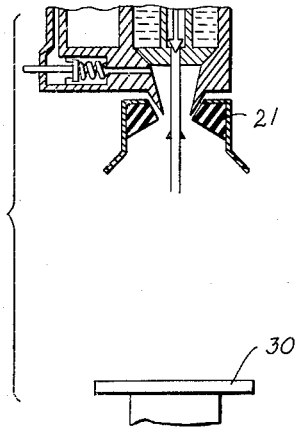

Referring to FIG. 2, it will be seen that the centering ring 3 is displaced below the valve housing 1 so that the sealing ring 21 does not engage the valve housing 1, and furthermore the vacuum valve 22 is closed, as diagrammatically indicated in FIG. 2. Moreover, the support 30 which is capable of moving upwardly and downwardly as by actuation of a suitable hydraulic structure does not have a bottle or other container thereon. Thus, FIG. 2 illustrates the position of the parts when they are at rest without a container on the support 30 to be filled with the air-sensitive liquid.

Figure 3:
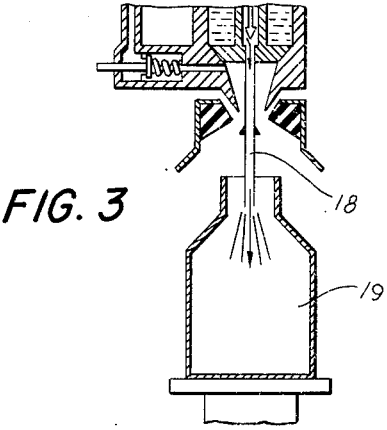

Referring to FIG. 3, it will be seen that a container 19 has been placed on the support 30 so that the bottom end portion of the tube 18 extends into the hollow interior of the container 19. The first step in the process is to actuate the control means 14 through a suitable camming structure to raise the rod 12 so that gas will flow from the space over the liquid through the tube 18 into the interior of the container 19, as indicated in FIG. 3. It should be noted that the pressure of the liquid on the valve member 7 maintains this valve member closed in opposition to the force of the spring 8, and the same is true with respect to the pressure of the gas which is in the vessel over the liquid. This latter gas, which may be carbon dioxide in the case of beer, is of course inert to air and since it is maintained under pressure, which is to say at a pressure greater than atmospheric pressure, in the vessel over the liquid this gas also will act to maintain the valve member 17 in its position closing the bore 16. Thus, it is only when the control means 14 moves the rod 12 upwardly through a slight distance that the gas under pressure will flow out through the tube 18 into the container 19, as indicated in FIG. 3. Thus, with the step of the process shown in FIG. 3 the interior of the container 19 will be washed with the inert gas, and as a result a considerable amount of air will be displaced from the interior of the container 19. Of course, the container 19 is filled with air just prior to being placed on the raising means 30 and just prior to being washed with the inert gas such as carbon dioxide.

Figure 4:
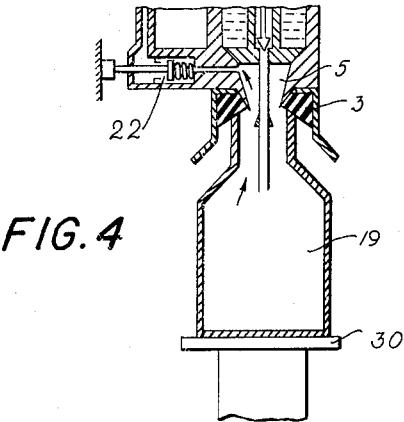

The next step of the process is illustrated in FIG. 4, from which it may be seen that the raising means 30 has been actuated to raise the container 19 so that the centering ring 3 is now also raised to have its sealing ring 21 pressing against the housing 1 of the filling valve means, and thus the parts assume the position diagrammatically indicated in FIG. 4. When the container 19 is moved to the position indicated in FIG. 4 the control means 14 is actuated by its cam so as to close the valve 16, 17 and thus the flow of gas from the space above the liquid into the container 19 is terminated. At this time the control means 14 has been turned downwardly from the position shown in FIG. 1 so that it presses against the lower disc 13 for maintaining the valve member 17 in its position on the valve seat 16.

Immediately after the container 19 has been placed in the position shown in FIG. 4 and the valve 16, 17 has been closed, a suitable cam actuates the vacuum valve means 22 so as to open this vacuum valve means and thus place the interior of the container 19 in communication with the source of vacuum, and thus at this time the container 19 is evacuated.

Figure 5:
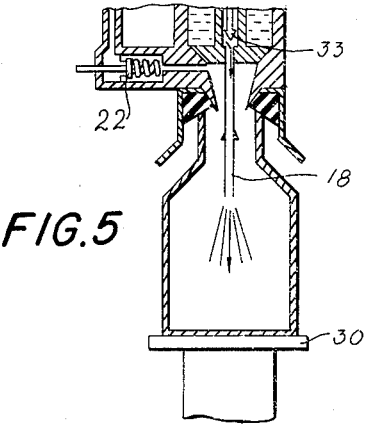

After the container 19 has been evacuated in this manner, so that a considerable amount of inert gas and air has thus been removed from the container 19, the valve member 17 is again raised to its open position by the control means 14, and thus the inert gas will again flow into and fill the container 19 which is maintained in engagement with the centering ring 3 in the position shown in FIG. 5 at this time. Valve 22 is closed before member 17 is raised.

Figure 6:
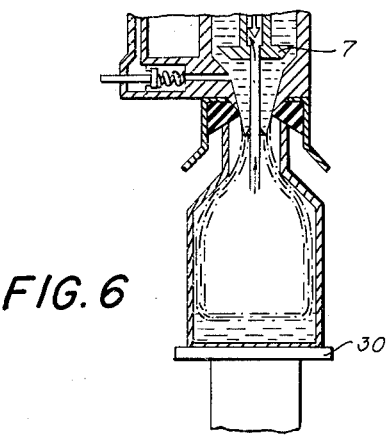

As soon as sufficient gas from the space over the liquid has flowed into the container 19 so as to equalize the pressure in the container 19 with the pressure of the gas over the liquid, the spring 8 will act automatically to raise the valve member 7. Therefore, at this time the filling valve means operates automatically to place the interior of the container 19 in communication with the liquid which now flows into the container, and of course the valve member 17 remains raised from the seat 16 so that the interior of the container is also placed in communication with the gas space above the liquid and thus while liquid flows into the interior of the container the interior of the container remains in communication with the gas space above the liquid. This stage of the process is illustrated in FIG. 6. As may be seen from FIG. 1 the housing 1 is provided with a downwardly tapering bore portion 5 extending beneath the fine wire mesh 6 through which the tube 18 slidably extends, and the liquid which flows downwardly around the valve member 7 flows downwardly through the tapering passage 5 along the exterior of the tube 18 so as to engage the baffle 20 and be spread by the baffle 20 in the form of a film of liquid against the inner surface of the container 19. When dealing with a liquid such as beer which is very likely to foam, the spreading of the liquid in the form of a film against the inner surface of the container greatly reduces any tendency of the liquid to foam while it is poured into the container. Moreover, it will be noted from FIG. 6 where the film of liquid provided by the baffle 20 is shown that as a result of the directing of the liquid away from the tube 18 the space which surrounds the lower end portion of the tube 18 is maintained clear of the liquid which is rising upwardly in the bottle and thus the gas in the container can freely flow into the opening at the lower end of the tube 18 and thus into the latter and back into the vessel. Thus, while liquid is flowing into the container the inert gas and whatever air remains in the container is displaced out of the container by the liquid, and the inert gas and air remnant, if any, which is thus displaced is directed by the tube 18 and by the tube 11 back into the gas space which is above the liquid which is flowing into the container.

The filling of the container continues until the liquid reaches the bottom end of the tube 18 and now of course the liquid can flow up through the tube 18. However, it will be noted that there will be trapped in the container above the liquid when this liquid reaches the opening at the bottom end of the tube 18 a body of inert gas which can no longer flow back through the tube 18 so that this gas remains in the container 19 at the upper portion of the neck thereof just above the liquid, and the fine wire mesh 6 acts in a manner well known in the art to prevent the gas from moving upwardly beyond the wire mesh 6, so that at this time the flow of liquid into the container stops and the container is filled except for the uppermost portion of its neck in which the inert gas is located.

Once the container is filled the filling valve means is closed by the cam which cooperates with the control means 14, and at this time the control means 14 presses down on the lower disc 13 for closing both the gas valve 16, 17 and the liquid valve 4, 7. An unillustrated valve structure well known in the art can also be carried by the valve housing 1 in order to place the interior of the container 19 at its upper portion very gradually in communication with the outer atmosphere so as to provide a gradual drop in the pressure of the gas which remains in the container 19 only adjacent to its upper end. The container which has thus been filled with gas is now removed and is transferred to a part of the apparatus where the bottle is capped, and of course during this very short period of time during the transfer of the container from the structure of the invention to the capping station there is a sufficient excess of carbon dioxide within the container 19 moving out through the open top end thereof to prevent air from entering into the container 19, so that when the bottle is capped the contents thereof are out of any possible communication with air at the exterior of the container and with the above-described process and apparatus of the invention it is clear that very little, if any, air remains in the container.

Figure 7:
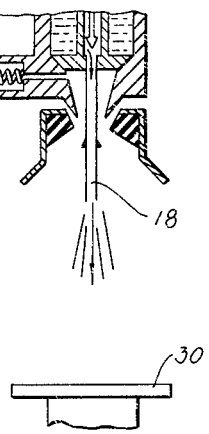

It will be noted that after the filled bottle has thus been removed from the filling apparatus the percentage of carbon dioxide in the gas space over the liquid in the vessel is reduced because of the relatively small amount of air which may have been displaced into this gas space during filling of the container with liquid. Therefore, in order to prevent a reduction in the concentration of the inert gas in the space over the liquid, after the container is removed, the valve member 17 is again raised from the bore 16 so that the gas in the space over the liquid will blow out through the tube 18 into the outer atmosphere, as indicated in FIG. 7, and the amount of gas blown out through the tube 18 in this manner is preferably several times the amount of gas displaced from the container into the space over the liquid. Then there is supplied to the space over the liquid clean inert gas, such as carbon dioxide, also in an amount several times the amount of gas which is displaced from the interior of the container 19, and thus in this way the richness of the inert gas over the liquid is maintained.

In accordance with a particular feature of the invention, instead of simply blowing some of the gas to the outer atmosphere, as shown in FIG. 7, the step of FIG. 7 is combined with that shown in FIG. 3, so that the gas which is used for washing the interior of the container 19 in order to displace a substantial amount of air therefrom is the gas from the space over the liquid and to which the gas from the interior of the previously-filled container has been displaced. Ordinarily, one might expect that if the step of FIG. 7 were combined with that of FIG. 3 there would remain in the container 19 a small amount of liquid at the bottom of the container onto which the liquid subsequently filled into the container would flow so as to create undesirable foaming. However, this undesirable result does not occur. It is true that there remains in the tube 18 the liquid which flows into the same at the end of the filling process. This liquid is of course blown out during the step of FIG. 7, and when this step of FIG. 7 is combined with that of FIG. 3 there is blown into the container 19 the liquid which is in the tube 18 as well as the additional gas which flows from the space over the liquid in the vessel. However, the liquid which reaches the container 19 during such a step is in the form of small bubbles, and during the subsequent step shown in FIG. 4 the vacuum action serves to break these bubbles so that what remains is a thin film of liquid which does not create any undesirable foaming. The bubbles of liquid in the container 19 produced by combining the step of FIG. 7 with that of FIG. 3 cling to the inner surface of the container and are spread over its inner surface so that when these bubbles break during the step of FIG. 4 the film of liquid is spread over the inner surface of the container 19.

It will be understood that each of the elements described above, or two or more together, may also find a useful application in other types of process and apparatus for handling air-sensitive liquids differing from the types described above.

While the invention has been illustrated and described as embodied in a process and apparatus for filling containers with air-sensitive liquids, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for filling a container with an air-sensitive liquid derived from a vessel in which the air-sensitive liquid is located with a gas which is inert to air located over the liquid in the vessel, the steps of placing the container which is to be filled in communication with a source of vacuum for evacuating the interior of the container; then directing the inert gas from the space over the liquid in the vessel into the interior of the container; then introducing the liquid from the vessel into the container to replace the inert gas therein as well as whatever air remains in the container after evacuation thereof; and directing the inert gas and whatever air remains in the container from the latter into the space in the vessel above the liquid therein during introduction of the liquid into the container from the vessel.

2. In a process for filling a container with an air-sensitive liquid derived from a vessel in which the air-sensitive liquid is located with a gas which is inert to air located over the liquid in the vessel, the steps of placing the container which is to be filled in communication with a source of vacuum for evacuating the interior of the container; then directing the inert gas from the space over the liquid in the vessel into the interior of the container; then introducing the liquid from the vessel into the container to replace the inert gas therein as well as whatever air remains in the container after evacuation thereof; directing the inert gas and whatever air remains in the container from the latter into the space in the vessel above the liquid therein during introduction of the liquid into the container from the vessel; blowing from the vessel the mixture of inert gas and the rest of the air removed from the container during the filling thereof with said liquid; and replacing the gas blown from the space in said vessel above the liquid with clean inert gas.

3. In a process for filling a container with an air-sensitive liquid derived from a vessel in which the liquid is located with the space in the vessel over the liquid filled with a gas which is inert to air, the steps of placing a container which is to be filled with the liquid in communication with a source of vacuum so as to evacuate the container; then filling the evacuated container with the inert gas from the space over the liquid in the vessel; then introducing into the container liquid from the vessel while directing the inert gas and whatever air remains in the container from the latter into the space in the vessel above the liquid therein so that the liquid in the container replaces the inert gas and whatever air remains therein; and then blowing out of the space in the vessel above the liquid the gas derived from the container as well as additional gas in the space above the liquid in said vessel to an extent which is several times greater than the amount of gas derived from the container; and replacing the gas blown out of the vessel with clean inert gas also in the amount which is several times the amount of gas derived from the container.

4. In a process for filling a container with an air-sensitive liquid derived from a vessel in which the liquid is located with the space over the liquid in the vessel filled with a gas which is inert to air, the steps of blowing into a container which is to be filled with the liquid inert gas derived from the interior of the vessel over the liquid therein so as to displace at least partially air from the interior of the container while replacing it with the inert gas; then placing the container in communication with a source of vacuum in order to evacuate the container and remove additional air therefrom; directing into the thus-evacuated container additional inert gas derived from the vessel in the space over the liquid therein so as to fill the evacuated container with said gas; and then filling the container with the liquid while directing from the container to the space in the vessel over the liquid therein gas displaced from the container by the liquid flowing into the same so that the inert gas and whatever air remains in the container are displaced therefrom into the space in the vessel over the liquid therein.

5. In a process for filling a container with an air-sensitive liquid derived from a vessel in which the liquid is located with the space over the liquid in the vessel filled with a gas which is inert to air, the steps of blowing into a container which is to be filled with the liquid inert gas derived from the interior of the vessel over the liquid therein so as to displace at least partially air from the interior of the container while replacing it with the inert gas; then placing the container in communication with a source of vacuum in order to evacuate the container and remove additional air therefrom; directing into the thus-evacuated container additional inert gas derived from the vessel in the space over the liquid therein so as to fill the evacuated container with said gas; then filling the container with the liquid while directing from the container to the space in the vessel over the liquid therein gas displaced from the container by the liquid flowing into the same so that the inert gas and whatever air remains in the container are displaced therefrom into the space in the vessel over the liquid therein; blowing out of the space in the vessel over the liquid therein the gas derived from the container; and replacing the thus blown-out gas with clean inert gas.

6. In a process for filling a container with an air-sensitive liquid derived from a vessel in which the liquid is located with the space over the liquid in the vessel filled with a gas which is inert to air, the steps of blowing into a container which is to be filled with the liquid inert gas derived from the interior of the vessel over the liquid therein so as to displace at least partially air from the interior of the container while replacing it with the inert gas; then placing the container in communication with a source of vacuum in order to evacuate the container and remove additional air therefrom; directing into the thus-evacuated container additional inert gas derived from the vessel in the space over the liquid therein so as to fill the evacuated container with said gas; then filling the container with the liquid while directing from the container to the space in the vessel over the liquid therein gas displaced from the container by the liquid flowing into the same so that the inert gas and whatever air remains in the container are displaced therefrom into the space in the vessel over the liquid therein; blowing out of the space in the vessel over the liquid therein the gas derived from the container; and replacing the thus blown-out gas with clean inert gas, the gas which is blown out of the vessel and the inert gas which replaces the same being in an amount which is several times the amount of gas derived from the container during the flow of the liquid into the same.

7. In a process for filling a series of containers with an air-sensitive liquid derived from a vessel in which the liquid is located with the space in the vessel over the liquid filled with a gas which is inert to air, the steps of placing a container which is to be filled with the liquid in communication with a source of vacuum so as to evacuate the interior of the container; then introducing into the thus-evacuated container the inert gas from the space in the vessel over the liquid therein; filling the container with liquid from the vessel while directing into the space in the vessel over the liquid therein the inert gas and whatever air remains in the container and is displaced therefrom by the introduction of the liquid; and, prior to placing the container in communication with the source of vacuum, blowing into the container gas from the space in the vessel over the liquid therein derived from the immediately preceding container which was filled with liquid.

8. In a process for filling a series of containers with an air-sensitive liquid derived from a vessel in which the liquid is located with the space in the vessel over the liquid filled with a gas which is inert to air, the steps of placing a container which is to be filled with the liquid in communication with a source of vacuum so as to evacuate the interior of the container; then introducing into the thus-evacuated container the inert gas from the space in the vessel over the liquid therein; filling the container with liquid from the vessel while directing into the space in the vessel over the liquid therein the inert gas and whatever air remains in the container and is displaced therefrom by the introduction of the liquid; prior to placing the container in communication with the source of vacuum, blowing into the container gas from the space in the vessel over the liquid therein derived from the immediately preceding container which was filled with liquid, the amount of gas blown into the container being several times greater than the amount of gas derived from the immediately preceding container; and replacing in the space in the vessel above the liquid therein the gas blown therefrom with clean inert gas in an amount also several times greater than the amount of gas derived from the container during the flow of liquid into the same.

References Cited by the Examiner

UNITED STATES PATENTS

| | | | |
|---|---|---|---|
| 2,261,706 | 11/41 | Weaver | 141—91 |
| 2,779,358 | 1/57 | Fechheimer et al. | 141—92 |
| 2,808,856 | 10/57 | Tiano et al. | 141—7 |
| 2,973,267 | 2/61 | Keller et al. | 141—6 XR |

FOREIGN PATENTS 788,014   12/57   Great Britain.

LAVERNE D. GEIGER, *Primary Examiner.*